United States Patent [19]

Chianese

[11] Patent Number: 4,802,772
[45] Date of Patent: Feb. 7, 1989

[54] NONELECTRIC TEMPERATURE MONITOR

[75] Inventor: Richard B. G. Chianese, Altamonte Springs, Fla.

[73] Assignee: Westinghouse Electric Corp., Pittsburgh, Pa.

[21] Appl. No.: 152,284

[22] Filed: Feb. 4, 1988

[51] Int. Cl.$^4$ ................................................ G10K 5/64
[52] U.S. Cl. .................................... 374/205; 116/221; 350/274; 374/152
[58] Field of Search ............... 374/205, 206, 207, 188, 374/152, 130, 131; 116/221; 350/273, 274

[56] References Cited

U.S. PATENT DOCUMENTS

| | | | |
|---|---|---|---|
| 3,586,439 | 6/1971 | Treharne et al. | 374/130 |
| 3,668,692 | 6/1972 | Englund et al. | 350/273 |
| 4,141,247 | 2/1979 | Schlick | 374/205 |
| 4,632,908 | 12/1986 | Schultz | 374/130 |

FOREIGN PATENT DOCUMENTS 1187827  2/1965  Fed. Rep. of Germany ...... 374/206

*Primary Examiner*—Harvey C. Hornsby
*Assistant Examiner*—Corinne M. Reinckens
*Attorney, Agent, or Firm*—D. C. Abeles

[57] ABSTRACT

Apparatus for monitoring temperature, including: a body which experiences a change in shape in response to a change in the temperature of the body; a rotatable device having an axis of rotation and an optical transmissivity which varies circumferentially and radially relative to the axis of rotation; a light conductor device disposed for passing a light beam along a beam axis which intersects the rotatable device at a location spaced from the axis of rotation; and an arrangement for rotating the rotatable device about the axis of rotation while the light beam impinges on the rotatable device such that the rotatable device permits light to be transmitted therethrough with an intensity which varies in time as a function of the distance between the beam axis and the axis of rotation, with one of the devices being mounted on the body such that a change in the shape of the body in response to a change in body temperature produces a corresponding change in the distance between the axis of rotation and the beam axis.

10 Claims, 2 Drawing Sheets

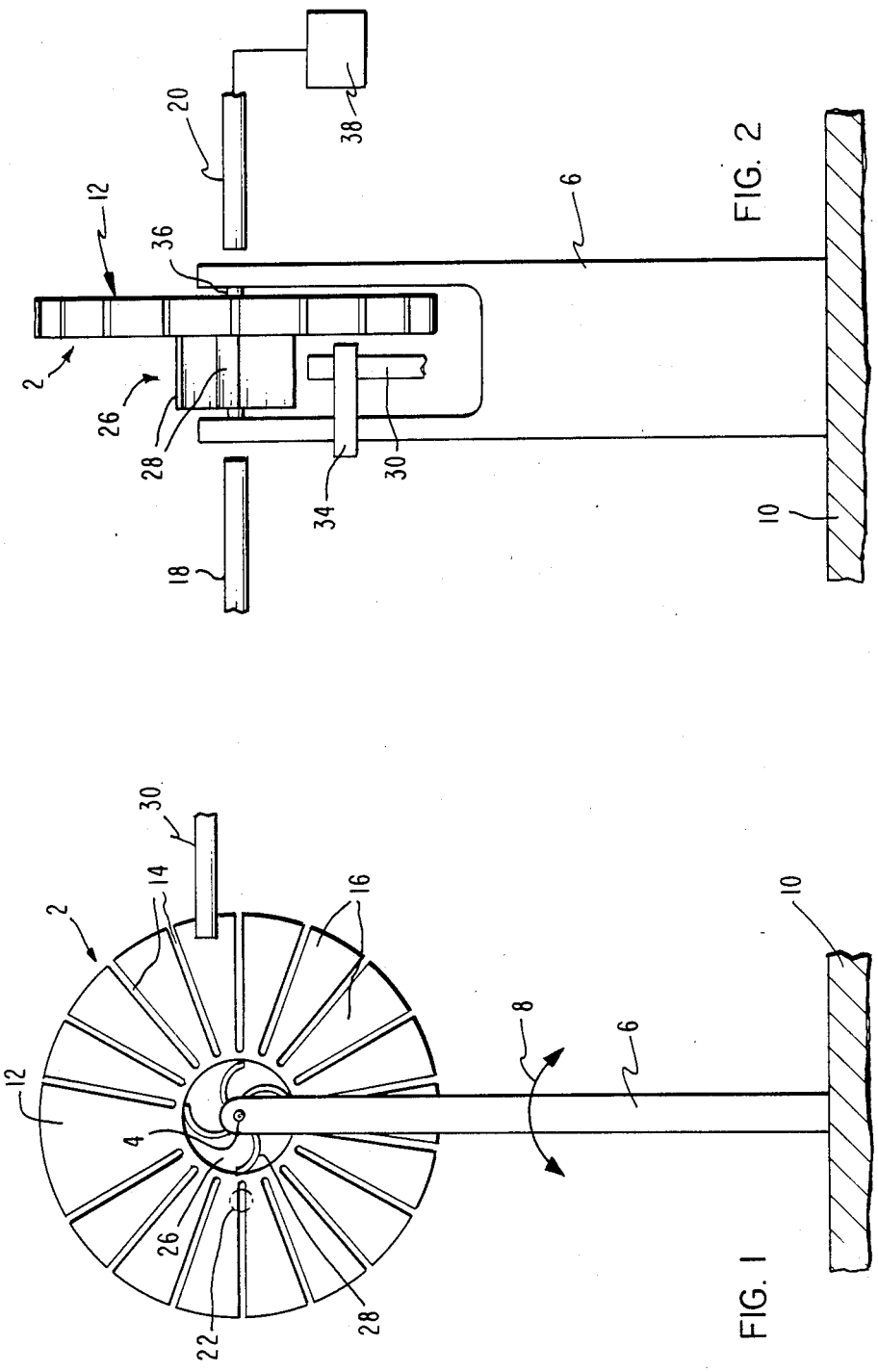

NONELECTRIC TEMPERATURE MONITOR

BACKGROUND OF THE INVENTION

The present invention relates to apparatus for monitoring temperature in a manner which does not require any electric current, and which can thus be safely used in high voltage environments.

It is common practice in many industrial fields to monitor temperature by means of thermocouples or temperature-dependent resistors. These devices are electrical in nature and cannot be used with complete safety in high voltage environments. For example, if such a temperature sensor were located near a high voltage conductor, and a short should form between the high voltage and the temperature monitor, a situation could arise which would be hazardous to operating personnel and which could damage the temperature sensing equipment.

SUMMARY OF THE INVENTION

It is an object of the present invention to provide a novel temperature monitoring apparatus whose sensing components are nonelectrical in nature and which can, therefore, be used with complete safety in any high voltage environment.

The above and other objects are achieved, according to the present invention, by apparatus for monitoring temperature, comprising: a body which experiences a change in shape in response to a change in the temperature of the body; a rotatable device having an axis of rotation and an optical transmissivity which varies circumferentially and radially relative to the axis of rotation; a light conductor device disposed for passing a light beam along a beam axis which intersects the rotatable device at a location spaced from the axis of rotation; means for rotating the rotatable device about the axis of rotation while the light beam impinges on the rotatable device such that the rotatable device permits light to be transmitted therethrough with an intensity which varies in time as a function of the distance between the beam axis and the axis of rotation; and means mounting one of the devices on the body such that a change in the shape of the body in response to a change in body temperature produces a corresponding change in the distance between the axis of rotation and the beam axis.

According to a preferred embodiment of the invention, the rotatable device is constituted by a disc having opaque regions alternating circumferentially with transparent regions. The disc is caused to rotate while a light beam is directed thereagainst so that light will pass through the disc only when it intercepts a transparent region. The light which does pass through the disk is delivered to an optical fiber which leads away from the monitoring location to a nonhazardous region, where the resulting light signal is converted into an electrical signal which is then processed to provide the desired temperature measurement.

The opaque and transparent regions are arranged on the disk in such a manner that the relation between the duration of each period of light transmission through the disc and each period of light blockage by the disc will be a function of the radial distance between the center of rotation of the disc and the axis of the light beam.

For example, if each transparent region has the form of a radial strip of constant width, while each opaque region increases in width in the radial direction, the light beam will be conducted through the disc for a shorter total time period during each rotation of the disc as the axis of disc rotation moves away from the axis of the light beam.

BRIEF DESCRIPTION OF THE DRAWING

FIG. 1 is a front elevational view of a preferred embodiment of a sensor according to the present invention.

FIG. 2 is a side elevational view of the embodiment of FIG. 1.

DESCRIPTION OF THE PREFERRED EMBODIMENTS

Figure 3:
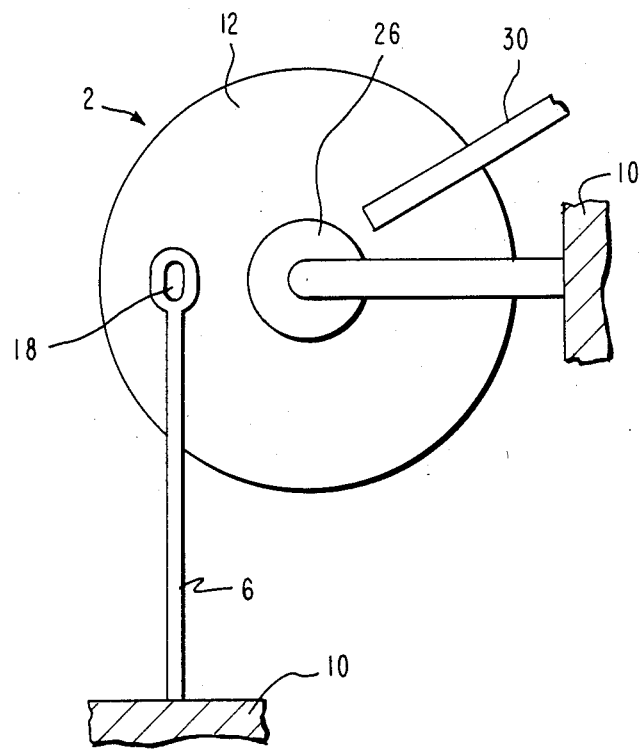
FIG. 3 is an elevational view similar to that of FIG. 1, but in simplified form, of a second preferred embodiment of a sensor according to the present invention.

FIGS. 1 and 2 illustrate a preferred embodiment of a sensor according to the invention, disposed at a location where a temperature is to be monitored. The sensor is basically composed of a disc 2 having an axis of rotation 4 via which disc 2 is supported on an elongated support member 6 which is constructed to undergo deflections in the direction of arrows 8 as a function of its temperature. By way of example, support member 6 can be a bimetallic strip or plate. The end of support member 6 which is opposite to the location of axis of rotation 4 is fixed to a supporting surface 10.

As is shown in FIG. 1, disc 2 includes an outer portion 12 composed of transparent regions 14 alternating circumferentially with opaque regions 16 and, as shown in FIG. 2, a fiber optic light source 18 is disposed in alignment with a fiber optic receiver 20, source 18 and receiver 20 being disposed to respectively opposite sides of disc 2, so that a light beam 22 produced by source 18 will impinge on disc region 12 and light from that beam will reach receiver 20 whenever a transparent region 14 is in the path of beam 22.

In the illustrated embodiment, each transparent region 14 is a narrow strip of constant width, while each opaque region 16 increases in width in the radial direction, i.e. has the form of a wedge. Thus, as the free end of support member 6 deflects to the right, and disc 2 rotates, the total of the time periods during which light reaches receiver 20 during each rotation of disc 2 will decrease.

Preferably, optical components 18 and 20 are located so that axis of rotation 4 is spaced from beam axis 22 in a direction which is substantially perpendicular to the length of support member 6, or more specifically is parallel to the direction of deflection 8 of support member 6. This assures that deflection of support member 6 will produce the maximum change in the light signal reaching receiver 20.

The arrangement shown in FIG. 1 corresponds essentially to the left-hand extremity of deflection travel of support member 6. In general, optical components 18 and 20 will be disposed so as to take into account the temperature range which is to be encountered.

Disc 2 further includes a central portion 26 carrying a plurality of curved blades 28 forming a gas turbine which is integral with portion 12.

A gas under pressure is supplied via a conduit 30 to form a gas stream which is directed against turbine blades 28. Preferably, conduit 30 is disposed, as shown for example in FIG. 1, so that deflection movement of support member 6 will not influence the orientation of the gas stream relative to the gas turbine. Alternatively, as indicated in FIG. 2, conduit 30 can be supported, by means of a clamp 34, on support member 6 and can have its outlet end extending at an acute angle to the vertical in order to direct an inclined upward gas stream against turbine blades 28. With this arrangement, at least the outlet end of conduit 30 is constructed to have a high degree of flexibility, so that the attachment of conduit 30 to support member 6 will not noticeably influence the deflection of support member 6.

As further shown in FIG. 2, disc 2 is supported on two arms of support member 6 by means of suitable pivot bearings 36.

In operation, disc 2 is caused to rotate by the gas stream supplied by conduit 30 while light beam 22 impinges on region 12 and support member 6 undergoes deflections in the directions of arrows 8 as a function of its temperature. This temperature may correspond to the temperature of the gas delivered by conduit 30, as would be the case if the apparatus were disposed for monitoring the temperature of the gas in gas innercooled generator coils, so that, in effect, it is the temperature of the gas which is being monitored.

As disc 2 rotates, beam 22 is periodically interrupted by opaque regions 16 and the total quantity of light transmitted to optical fiber receiver 20 during each rotation of disc 2 will be dependent on the degree of deflection of support member 6, which determines the radial location at which light beam 22 impinges on portion 12.

The light received by optical fiber receiver 20 is conducted to an electronic evaluation device 38 which can be disposed at a location remote from the high voltage environment. At device 38 the light from receiver 20 is converted into a corresponding electrical signal, for example by means of a photodiode or phototransistor.

This electrical signal, which is proportional to the intensity of light arriving at, and conducted by, fiber 20, can be evaluated in a variety of ways. Thus, by way of example, part 12 can have one transparent region 14 eliminated, as shown at the top of FIG. 1, to provide a timing mark. The pulsed signal produced during the rotation of disc 2 will then have a form such that the rate of rotation of disc 2 can be determined. With this information, the average time between successive light pulses, resulting from interception of light beam 22 by successive transparent regions 14, can be monitored to provide an indication of the radial position of beam 22 across portion 12.

Alternatively, this radial position can be determined simply by providing an indication of the sum of the light transmitting periods during any arbitrarily selected measuring period or by determining the average intensity of the light conducted by receiver 20 during a selected measuring period. When the average light intensity is to be determined, device 38 could also be provided with an indication of the intensity of the beam produced by light source 18. In either case, the sum of the light conducting periods or the average intensity of the light reaching receiver 20 will be proportional to the radial position of light beam 22 with respect to portion 12 because either quantity will be proportional to the realtion between the width of each transparent portion 14 and the width of each opaque portion 16 at the radial location where light beam 22 impinges on portion 12, and a transparent strip need not be eliminated from portion 12.

According to an alternative embodiment of the invention, as shown in FIG. 3, disc 2 can be mounted on a fixed support and optical fibers 18 and 20 can be mounted on support member 6. This alternative would eliminate the need for any separate measures for maintaining the desired positional relation between conduit 30 and turbine blades 28.

According to still another embodiment of the invention, when temperature measurement is to be performed within an electrical device, such as a generator, in a region where a suitable varying electromagnetic field is present, the gas turbine can be replaced by a small rotor winding, e.g. a squirrel cage, fixed to disc 2. Then, the electromagnetic field already present in the device can supply the energy required to drive the rotor.

It will be understood that the above description of the present invention is susceptible to various modifications, changes, and adaptations, and the same are intended to be comprehended within the meaning and range of equivalents of the appended claims.

What is claimed is:

1. Apparatus for monitoring temperature, comprising: a body which experiences a change in shape in response to a change in the temperature of said body; a rotatable device having an axis of rotation and an optical transmissivity which varies circumferentially and radially relative to the axis of rotation; a light conductor device disposed for passing a light beam along a beam axis which intersects said rotatable device at a location spaced from the axis of rotation; means for rotating said rotatable device about the axis of rotation while the light beam impinges on said rotatable device such that said rotatable device permits light to be transmitted therethrough with an intensity which varies in time as a function of the distance between the beam axis and the axis of rotation; and means mounting one of said devices on said body such that a change in the shape of said body in response to a change in body temperature produces a corresponding change in the distance between the axis of rotation and the beam axis.

2. Apparatus as defined in claim 1 wherein said means for rotating said rotatable device comprise: gas turbine means mounted on said rotatable device; and gas supply means for directing a stream of gas against said turbine means with a force sufficient to rotate said rotatable device.

3. Apparatus as defined in claim 2 wherein said gas supply means are disposed for causing the temperature of said body to be influenced by the temperature of the gas.

4. Apparatus as defined in claim 1 wherein said means for rotating said rotatable device comprise a rotor connected to said device and driveable by an electromagnetic field.

5. Apparatus as defined in claim 1 wherein said rotatable device is composed of a plurality of radially extending first regions having a first optical transmissivity alternating circumferentially with second regions having a second optical transmissivity that differs substantially from the first optical transmissivity, said regions being configured such that a radially varying relation exists between the circumferential extent of said first regions and the circumferential extent of said second regions.

6. Apparatus as defined in claim 5 wherein each said first region is a radially extending region of constant width, and each said second region is a radially extending region having a width which increases as a direct function of distance from the axis of rotation.

7. Apparatus as defined in claim 6 wherein one of the optical transmissivities is a high optical transmissivity and the other one of the optical transmissivities is a low optical transmissivity.

8. Apparatus as defined in claim 5 wherein one of the optical transmissivities is a high optical transmissivity and the other one of the optical transmissivities is a low optical transmissivity.

9. Apparatus as defined in claim 1 wherein said rotatable device is mounted on said body by said mounting means.

10. Apparatus as defined in claim 1 wherein said light conductor device is mounted on said body by said mounting means.

* * * * *